US012712972B2

(12) United States Patent
Singh et al.

(10) Patent No.: US 12,712,972 B2
(45) Date of Patent: Aug. 18, 2026

(54) SYSTEM AND METHOD FOR GENERATING AND MANAGING A WORKFLOW USING WEBHOOK TECHNOLOGY

(71) Applicant: Bank of America Corporation, Charlotte, NC (US)

(72) Inventors: Shailendra Singh, Thane West (IN); Krishna Rangarao Mamadapur, Pune (IN)

(73) Assignee: Bank of America Corporation, Charlotte, NC (US)

( * ) Notice: Subject to any disclaimer, the term of this patent is extended or adjusted under 35 U.S.C. 154(b) by 167 days.

(21) Appl. No.: 18/628,307

(22) Filed: Apr. 5, 2024

(65) Prior Publication Data

US 2025/0317517 A1 Oct. 9, 2025

(51) Int. Cl.

| | |
|---|---|
| ***H04M 3/523*** | (2006.01) |
| ***G06Q 30/016*** | (2023.01) |
| ***G10L 15/06*** | (2013.01) |
| ***G10L 15/22*** | (2006.01) |
| ***G10L 25/18*** | (2013.01) |

(52) U.S. Cl.

CPC ........ *H04M 3/5232* (2013.01); *G06Q 30/016* (2013.01); *G10L 15/063* (2013.01); *G10L 15/22* (2013.01); *G10L 25/18* (2013.01)

(58) Field of Classification Search

CPC ............. H04M 3/5232; H04M 3/5166; H04M 3/5175; G06Q 30/016; G10L 15/063; G10L 15/22; G10L 25/18; G10L 15/1822; G10L 25/48

See application file for complete search history.

(56) References Cited

U.S. PATENT DOCUMENTS

| | | | |
|---|---|---|---|
| 7,319,960 | B2 | 1/2008 | Riis et al. |
| 8,442,833 | B2 | 5/2013 | Chen |
| 8,639,508 | B2 | 1/2014 | Zhao et al. |
| 8,645,131 | B2 | 2/2014 | Rao et al. |
| 8,756,062 | B2 | 6/2014 | Talwar et al. |
| 9,043,213 | B2 | 5/2015 | Chun |
| 9,070,367 | B1 | 6/2015 | Hoffmeister et al. |
| 9,202,465 | B2 | 12/2015 | Talwar et al. |
| 9,536,525 | B2 | 1/2017 | Hayakawa |
| 9,570,066 | B2 | 2/2017 | Talwar et al. |
| 9,865,249 | B2 | 1/2018 | Talwar et al. |
| 10,176,809 | B1 | 1/2019 | Piérard |
| 10,276,149 | B1 | 4/2019 | Liang et al. |
| 10,448,115 | B1 | 10/2019 | Jamal et al. |
| 10,783,890 | B2 | 9/2020 | Visser et al. |
| 11,031,002 | B2 | 6/2021 | Casado et al. |
| 11,763,801 | B2 | 9/2023 | Sima et al. |

(Continued)

*Primary Examiner* — Darioush Agahi

(57) ABSTRACT

In response to detecting that a voice call has been placed by a first user to an interaction entity, a voice spectrogram is generated of a voice interaction between the first user and a second user associated with the interaction entity and a plurality of signal attributes are extracted from the voice spectrogram. Additionally, a content of the voice interaction is extracted from the voice call. Based on the signal attributes and the content of the voice call, an issue is determined. A resolution entity that is configured to resolve the issue is identified and a webhook payload including an indication of the identified issue is transmitted to the resolution entity for resolution of the issue.

20 Claims, 2 Drawing Sheets

(56) References Cited

U.S. PATENT DOCUMENTS

| | | | | |
|---|---|---|---|---|
| 12,440,147 | B2 * | 10/2025 | Sarkar | A61B 5/6813 |
| 2007/0129945 | A1 | 6/2007 | Ma et al. | |
| 2013/0080172 | A1 | 3/2013 | Talwar et al. | |
| 2013/0151254 | A1 | 6/2013 | Seshadri | |
| 2022/0115028 | A1 * | 4/2022 | Dhawan | G10L 15/00 |
| 2023/0058560 | A1 * | 2/2023 | Biswas | G10L 25/06 |
| 2024/0089224 | A1 * | 3/2024 | Vadlamani | H04L 51/56 |
| 2024/0283868 | A1 * | 8/2024 | Ferris | G06F 40/253 |

* cited by examiner

SYSTEM AND METHOD FOR GENERATING AND MANAGING A WORKFLOW USING WEBHOOK TECHNOLOGY

TECHNICAL FIELD

The present disclosure relates generally to network communication, and more specifically to a system and method for generating and managing a workflow using webhook technology.

BACKGROUND

When users who are subscribed to receive a product or service call into a call center and chat with an agent at the call center, no systems and/or mechanisms exist that can identify issues associated with the product or service based on the voice calls and resolve the identified issues.

SUMMARY

The system and method implemented by the system as disclosed in the present disclosure provide technical solutions to the technical problems discussed above by intelligently identifying and resolving issues associated with a product or service received by a user.

For example, the disclosed system and methods provide the practical application of identifying one or more issues based on voice calls placed by a user to an interaction entity. As described in embodiments of the present disclosure, an issue manager monitors voice calls placed by a user to an interaction entity. The voice calls may relate to a service that the user is registered/subscribed to receive. Further, a voice call may include a voice interaction between the user and an agent associated with the interaction entity. Upon detecting that a voice call has been placed by the user to the interaction entity, the issue manager generates a voice spectrogram of the voice call and extracts a plurality of signal attributes from the voice spectrogram of the voice call, wherein each signal attribute represents a characteristic of the voice signal. The issue manager further extracts a content of the voice call, wherein the content of the voice interaction comprises words and sentences spoken by the user and/or an agent as part of the voice call. Based on the signal attributes of associated with the voice call and the content of the voice call, the issue manager identifies an issue that needs to be resolved. The issue manager identifies a resolution entity that is configured to resolve the identified issue, generates a webhook payload including at least an indication of the determined issue, and routes the webhook payload to a pre-configured network address of the resolution entity for resolution of the issue.

By intelligently identifying issues, the disclosed system and method facilitate prompt resolution of any issues associated with the user. The issues associated with the user may include malfunctioning hardware devices (e.g., computing devices) and other software issues associate with hardware devices used by the user. By promptly identifying and resolving issues associated with the devices used by the user, the disclosed system and method improve performance of computing devices used by the user.

Thus, the disclosed system and method generally improve technology associated with identification and resolution of user and device issues associated with a product or service received by the user.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
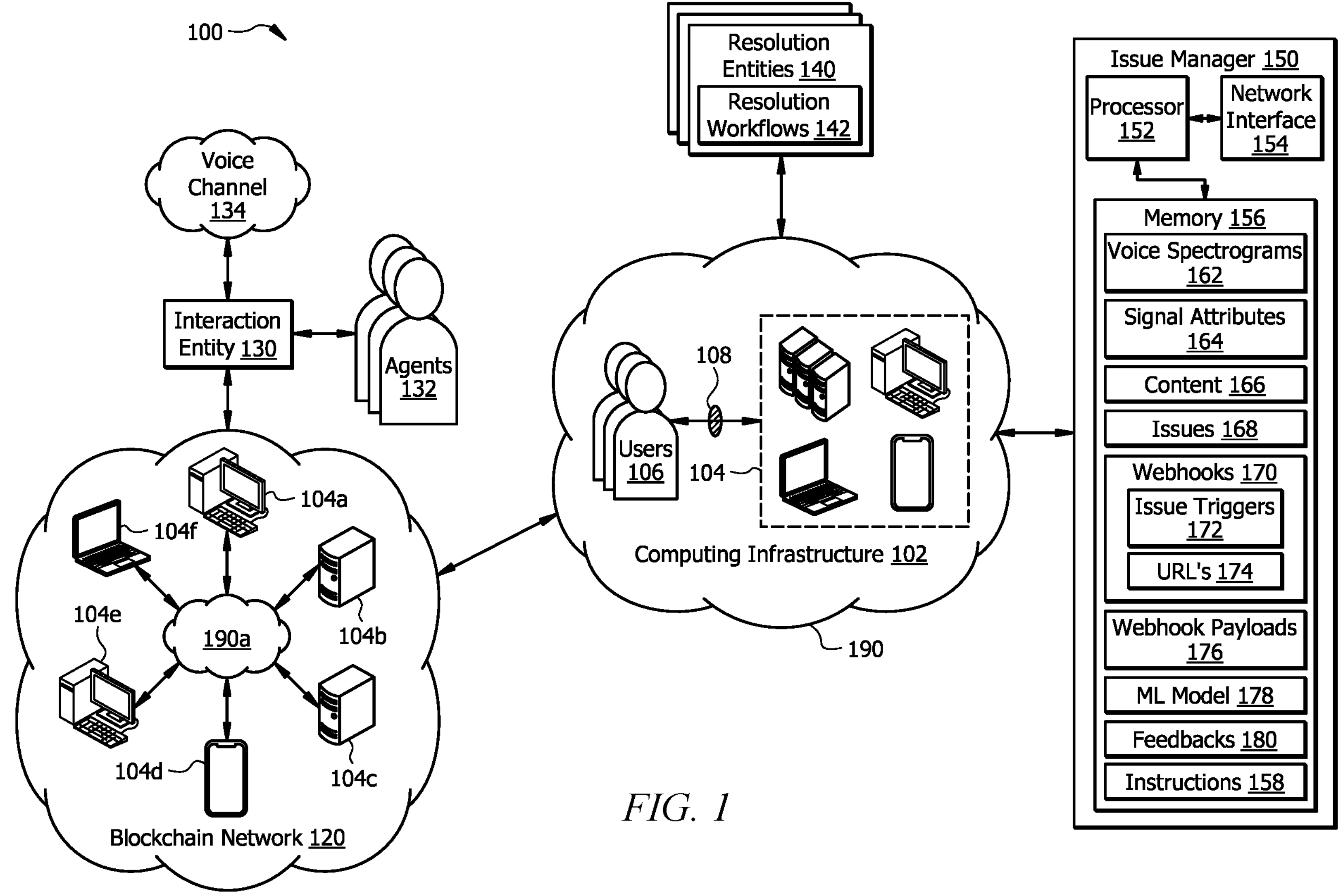
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes 104 including, but not limited to, operating systems, user interface applications, third party software, database management software, service management software, mainframe software, metaverse software, AI tools and other customized software programs (e.g., issue manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the issue manager 150. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102. In certain embodiments, one or more users 106 may be registered with an entity that owns or manages the computing infrastructure 102 and may be configured to receive one or more services provided by at least a portion of the computing infrastructure 102. For example, one or more servers in the computing infrastructure 102 may be configured to provide video streaming services. Users 106 may subscribe to receive the video streaming service provided by the respective servers of the computing infrastructure 102. In another example, a user 106 may be registered to store a data file having data objects at a server of the computing infrastructure 102 and perform one or more data interactions associated with the data file such as transferring data objects from the data file to another data file and/or receiving data objects into the data file from another data file.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., issue manager 150) as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

At least a portion of the computing infrastructure 102 may include and/or implement a blockchain network 120. For example, a portion of the computing nodes 104 may form the blockchain network 120. As shown in FIG. 1, example blockchain network 120 includes computing nodes 104*a*, 104*b*, 104*c*, 104*d*, 104*e* and 104*f* connected to each other via a portion of the network 190 (shown as 190*a*). The blockchain network 120 implements distributed computing which generally refers to a method of making multiple computers (e.g., computing nodes 104*a*-104*f*) work together to solve a common problem. This makes a computer network (e.g., blockchain network 120) appear as a powerful single computer that provides large-scale resources to deal with complex challenges. For example, distributed computing can encrypt large volumes of data, solve complex physics and chemical equations with many variables, and render high-quality, three-dimensional video animation. Distributed computing often uses specialized software applications that are configured to run on several computing nodes 104 instead of on just one computer, such that different computers perform different tasks and communicate to develop the final solution. High-performing distributed computing is often used in engineering research, financial services, energy sector and the like to run complex processes.

Blockchain network 120 may implement a blockchain (not shown) across a plurality of the computing nodes 104 (e.g., computing nodes 104*a*-104*f*). A blockchain generally is an open, decentralized and distributed digital ledger consisting of records called blocks that are used to record data interactions across many computing nodes (e.g., computing nodes 104*a*-104*f*). Each computing node 104 of a blockchain network (e.g., blockchain network 120) may maintain a copy of the blockchain ledger. Logically, a blockchain is a chain of blocks which contains specific information. Once recorded, the data in any given block cannot be altered retroactively without alteration of all subsequent blocks, which requires consensus of the network majority. Each computing node 104 within the blockchain network 120 maintains, approves, and updates new entries. The system is controlled not only by separate individuals, but by everyone within the blockchain network 120. Each member ensures that all records and procedures are in order, which results in data validity and security. Thus, the distributed ledger can record data interactions between two parties (e.g., users 106) efficiently and in a verifiable and permanent way. By design, a blockchain is resistant to modification of the data.

In certain embodiments, an entity that owns and/or manages the blockchain network 120 may provide one or more services which may be consumed by users 106 registered with/subscribed to the entity. For example, one or more servers connected to the blockchain network 120 may be configured to provide video streaming services. Users 106 may subscribe to receive the video streaming service provided by the respective servers. In another example, a user 106 may be registered to store a data file having data objects at a server of the blockchain network 120 and perform one or more data interactions associated with the data file such as transferring data objects from the data file to another data file and/or receiving data objects into the data file from another data file.

In certain embodiments, one or more computing nodes 104*a*-104*f* of the blockchain network 120 may implement an interaction entity 130 that is configured to receive voice calls from users 106. For example, users 106 that are setup to receive one or more services provided by computing nodes 104*a*-104*f* and/or other computing nodes 104 of the computing infrastructure 102 may place voice calls to the interaction entity 130 to manage their services (e.g., add and/or drop services), request information relating to one or more services, and/or raise issues (e.g., complaints) related to the one or more services being received by the users 106. For example, a user 106 that is registered to receive a video streaming service may call the interaction entity 130 to report an interruption in the service, enquire about shows provided as part of the registration, setup devices that can stream video, subscribe to new channels, drop already subscribed channels and the like. In one embodiment, the interaction entity 130 may support one or more voice channels (e.g., phone numbers, voice chat, video chat, voice data files etc.) that may be used to receive voice calls from users 106. In one embodiment, the interaction entity 130 may provide one or more agents 132 (e.g., one or more of the users 106) that are configured to receive and attend to voice calls received from users 106 on one or more voice channels. It may be noted that a voice call may refer to any method by which a user 106 may transmit a voice message and/or conduct a voice/video conversation with an agent 132 at the interaction entity.

At least a portion (e.g., one or more computing nodes 104) of the computing infrastructure 102 may include and/or implement a plurality of resolution entities 140. Each resolution entity 140 is configured to resolve one or more issues relating to one or more services being received by the users 106. For example, when the service includes a video streaming service, a first resolution entity 140 may be configured to resolve issues associated with accounts (e.g., logins, passwords, content subscription etc.), a second resolution entity 140 may be configured to resolve issues including software bugs associated with the streaming platform, and a third resolution entity 140 may be configured to resolve hardware issues associated with devices registered to receive the streaming service. A resolution entity 140 may be configured to resolve an identified issue by implementing/running a resolution workflow 142 including a series of resolution steps to resolve the issue. In one embodiment, resolution entity 140 may be a software entity (e.g., a software program such as a machine learning module) that is configured to automatically implement a resolution workflow to resolve an identified issue.

Generally, several rules and regulations are laid down by regulatory authorities relating to handling of issues (e.g., complaints) reported by users 106 (e.g., consumers). These rules and regulations are meant for consumer protection and to ensure that consumers of a service receive fair treatment from the service providers and customer issues are promptly and appropriately resolved. Accordingly, issues/complaints reported by users/consumers need to be handled carefully according to the defined regulations and policies to avoid regulatory issues. In any case, prompt and appropriate resolution of user issues regarding a service is generally necessary to avoid user dissatisfaction and improve user retention.

Embodiments of the present disclosure describe techniques for monitoring voice calls placed by a user 106 (e.g., voice calls received at the interaction entity 130), identify issues/complaints based on the voice calls, and promptly resolve the identified issues.

At least a portion of the computing infrastructure 102 (e.g., one or more computing nodes 104) may implement an issue manager 150 which may be configured to identify issues 168 based on voice interactions between a user 106 of a service and an agent 132, and orchestrate resolution of the identified issues 168. The issue manager 150 comprises a processor 152, a memory 156, and a network interface 154. The issue manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the issue manager 150. In this way, processor 152 may be a special-purpose computer designed to implement the functions disclosed herein. In one or more embodiments, the issue manager 150 is implemented using logic units, FPGAs, ASICs, DSPs, or any other suitable hardware. The issue manager 150 is configured to operate as described with reference to FIG. 2. For example, the processor 152 may be configured to perform at least a portion of the method 200 as described in FIG. 2.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store voice spectrograms 162 of voice interactions between users 106 and agents 132, signal attributes 164 associated with the voice spectrograms 162, content 166 of voice interactions between users 106 and agents 132, issues 168, webhooks 170 (including issue triggers 172 and URLs 174), webhook payloads 176, machine learning model 178, feedbacks 180, and instructions 158, and any other data needed to performed operations of the issue manager 150 as described in embodiments of the present disclosure. The instructions 158 may include any suitable set of instructions, logic, rules, or code operable to execute the sandbox manager 150.

The network interface 154 is configured to enable wired and/or wireless communications. The network interface 154 is configured to communicate data between the issue manager 150 and other devices, systems, or domains (e.g., interaction entity 130, resolution entities 140 etc.). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104, interaction entity 130 and resolution entities 140 may be implemented like the issue manager 150 shown in FIG. 1. For example, each of the computing nodes 104, interaction entity 130 and resolution entities 140 may have a respective processor and a memory that stores data and instructions to perform a respective functionality of the computing node 104, interaction entity 130 and resolution entity 140 respectively.

In one or more embodiments, the issue manager 150 may be configured identify issues 168 associated with a user 106 that needs to be resolved, based on a voice interaction between the user 106 and an agent 132 associated with the interaction entity 130. As described above, a user may be registered/subscribed to receive a product/service provided by an entity (e.g., one or more computing nodes 104). For example, a user 106 that is registered/subscribed to receive a service provided by one or more computing nodes 104 (e.g., one or more computing nodes 104*a*-104*f* of the blockchain network 120) of the computing infrastructure 102 may place voice calls 108 to the interaction entity 130 using a voice channel 134 to manage the service, request information relating to the service, and/or raise issues (e.g., complaints) related to the service being received by the user 106. For example, a user 106 that is registered to receive a video streaming service may place a voice call 108 to the interaction entity 130 using the voice channel 134 to report an interruption in the service, enquire about shows provided as part of the registration, setup devices that can stream video, subscribe to new channels, drop already subscribed channels and the like.

The issue manager 150 may be communicatively coupled to the interaction entity 130 such that the issue manager 150 has access to voice calls 108 placed by users 106 to the interaction entity 130. For example, the issue manager 150 may be configured to monitor the interaction entity 130 for voice calls 108 placed to the interaction entity 130. In one embodiment, a voice call 108 placed by a user 106 to the interaction entity 130 may include a voice interaction (e.g., voice conversation) between the user 106 and an agent 132 that receives the voice call 108 for the interaction entity 130. In alternative embodiment, a voice call 108 may include a voice recording (e.g., a voice message) transmitted by the user 106 to the interaction entity 130 using a voice channel 134 such as email, messaging service, social media or any other channel that allows the user 106 to transmit voice to the interaction entity 130.

The issue manager 150 may be configured to generate a voice spectrogram 162 of a voice call 108 placed by a user 106 to the interaction entity 130, wherein the voice spectrogram 162 is a representation of a voice signal associated with the voice call 108. Generally, a voice spectrogram 162 of a voice signal/audio signal is a visual representation of the spectrum of frequencies associated with the voice signal as the voice signal varies with time. Spectrograms associated with audio signals are often also referred to as sonographs, voiceprints, or voicegrams. The issue manager 150 may be configured to extract a plurality of signal attributes 164 from the voice spectrogram 162 of the voice call 108, wherein the signal attributes 164 may include, but are not limited to, one or more of voice modulation, pauses, speech duration, breathing, pitch, frequency or loudness. Additionally, or alternatively, the issue manager 150 may be configured to extract a content 166 of the voice call 108, wherein content 166 of the voice call 108 may include speech included in the voice call 108. For example, the content 166 of a voice call 108 may include words and sentences spoken by the user 106 and/or an agent 132 as part of the voice call 108.

In one embodiment, based on the signal attributes and/or the content 166 of the voice call 108 placed by the user 106, the issue manager 150 may be configured to determine one or more issues 168 associated with the user 106 that may need to be resolved. For example, the issue manager 150 may analyze the voice spectrogram 162 of the voice signal associated with the voice call 108 to identify certain known patterns of the signal attributes 164 that are known to be indicative of issues 168 associated with users 106. Indicators of a potential issue being expressed/stated by the user 106 as part of the voice call 108 may include a breathing pattern, a voice modulation pattern, pitch, frequency, amplitude/loudness or a combination thereof. For example, the issue manager 150 may detect that the voice spectrogram 162 includes high pitch and high amplitude signals. This may indicate that the user 106 is speaking loudly (corresponding to high amplitude signals) and at a high pitch, which in turn may indicate that the user is irate and that the user 106 is speaking of a potential issue that may need to be resolved.

In some embodiments, the issue manager 150 may be configured to assign one or more numerical scores based on the signal attributes 164 extracted from the voice spectrogram 162 of the voice call 108. For example, a numerical score may be assigned to a signal attribute 164, wherein a higher value of the signal attribute 164 is assigned a higher numerical score. For example, a higher amplitude may be assigned a higher numerical score. In one embodiment, when the numerical scores assigned to one or more respective signal attributes 164 equal or exceed respective thresholds, the issue manager 150 determines that a potential issue 168 exists. For example, when a first numerical score associated with a pitch and a second numerical score associate with amplitude exceed their respective pitch and amplitude thresholds for a pre-defined time, issue manager 150 determines that an issue 168 exists that may need resolution.

Additionally, or alternatively, the issue manager 150 may be configured to semantically analyze the content 166 of the voice call 108 to identify certain contextual keywords and/or sentences that may indicate that an issue 168 is being reported, stated or discussed in the voice call 108. In one embodiment, the contextual keywords and/or sentences may include specific references to a particular issue 168. For example, the user 106 may explicitly state/report an issue 168 during the voice call 108. For example, the user 106 may call the interaction entity 130 and report that a particular video streaming device does not connect to the video streaming server. In another additional or alternative embodiment, the contextual keywords and/or sentences may include words and/or sentences that are indicative of particular issues 168. For example, while the user 106 may not explicitly state/report a particular issue 168 during the voice call 108, the user's speech and/or conversation with an agent 132 (e.g., during a voice interaction between the user 106 and the agent 132) may indicate that an issue 168 exists. For example, the user 106 may call the interaction entity 130 and ask instructions for connecting a video streaming device to a video streaming server. This indicates the user 106 is potentially having an issue 168 with connecting to the video streaming server. In another example, the content 166 of the voice call 108 may include a conversation between the user 106 and an agent 132 in which the agent 132 repeatedly provides same or similar instructions to the user 106 on how to connect the streaming device to a streaming server. This may indicate that the user 106 is unable to connect to the streaming server after multiple attempts.

In additional or alternative embodiments, the issue manager 150 may be configured to identify one or more issues 168 that need resolving based on a combination of the signal attributes 164 extracted from the voice spectrogram 162 and the content 166 of the voice call 108. For example, the issue manager 150 may determine that a potential issue exists based on the tone and volume of the user's speech. Further, the issue manager 150 may identify a specific issue 168 based on contextual keywords/sentences in the content 166 of the voice call 108.

In certain embodiments, the issue manager 150 may use a machine learning (ML) model 178 (e.g., an artificial Intelligence (AI) algorithm) to identify one or more issues 168 based on the signal attributes 164 extracted from the voice spectrogram 162 and the content 166 of the voice call 108. In this context, the ML model 178 may be trained using known patterns of signal attributes 164 and known contextual keywords/sentences that correspond to known issues 168. The issue manager 150 may input the signal attributes 164 extracted from the voice spectrogram 162 and the content 166 of the voice call 108 to the ML model 178 to receive an identification of one or more issues 168 as an output of the ML model 178.

In one embodiment, once an issue 168 has been identified based on the voice call 108 using the ML model 178, the issue manager 150 may invite feedback 180 relating to the correctness of the identified issue 168 from a reviewer. It may be noted that the reviewer may be one of the users 106 of the computing infrastructure 102. For example, the issue manager 150 may transmit information relating to the identified issue 168 to a computing node 104 operated by the reviewer. The information provided to the reviewer may include one or more of an identity of the identified issue 168, the voice spectrogram 162 of the voice call 108, the signal attributes 164, or the content 166 of the voice call 108. The reviewer may provide feedback 180 including, but not limited to, whether the identified issue 168 is correct/incorrect and/or changes/adjustments to the identified issue 168. The feedback 180 may be fed back to the ML model 178 to retrain the ML model 178 and improve identification of subsequent issues 168.

In some embodiments, the issue manager 150 may be configured to analyze the voice call 108 in real-time or near real-time as a voice interaction (e.g., voice conversation) is being conduct between the user 106 who initiated the voice call 108 and an agent 132 associated with the interaction entity 130. For example, upon detecting that a voice call 108 has been placed by a user 106 to the interaction entity 130 and that a voice interaction has started between the user and an agent 132 associated with the interaction entity 130, the issue manager 150 starts generating the voice spectrogram 162 of the voice interaction and starts extracting the content 166 of the voice interaction as the voice interaction is being conducted between the user 106 and the agent 132. In conjunction with generating the voice spectrogram 162 and extracting the content 166, the issue manager 150 starts analyzing in real-time the signal attributes 164 associated with the voice spectrogram 162 and the content 166 as they are being generated and starts identifying any potential issues 168 in real-time. This allows quick identification and resolution of issues 168.

In additional or alternative embodiments, the issue manager 150 analyzes a recording of a voice call 108 (e.g., a voice interaction between the user 106 and an agent 132) to identify one or more issues 168 associated with the user 106 as described above.

Once an issue 168 is identified based on a voice call 108 placed by a user 106, the issue manager 150 may be configured to forward an indication of the identified issue 168 to a resolution entity 140 that is configured to resolve the identified issue 168. As described above, each resolution entity 140 shown in FIG. 1 is configured to resolve one or more known issues associated with users 106 (e.g., issues relating to one or more services being received by the users 106). For example, when the service includes a video streaming service, a first resolution entity 140 may be configured to resolve issues associated with accounts (e.g., logins, passwords, content subscription etc.), a second resolution entity 140 may be configured to resolve issues including software bugs associated with the streaming platform, and a third resolution entity 140 may be configured to resolve hardware issues associated with devices registered to receive the streaming service.

In one or more embodiments, a webhook 170 may be configured at the issue manager 150 for each resolution entity 140. A webhook 170 is an HTTP-based callback function that allows event driven communication between software applications. Each configured webhook 170 causes the issue manager 150 to transmit a pre-configured webhook payload 176 to a particular resolution entity 140 in response to detection/determination of a pre-configured trigger event. As shown in FIG. 1, a webhook 170 may include an issue trigger 172 and a Uniform Resource Locator (URL) 174. The issue trigger 172 associated with a webhook 170 defines one or more issues 168 that trigger transmission of a pre-configured webhook payload 176 to a resolution entity 140 associated with the webhook 170. In other words, for each configured webhook 170, the issue manager 150 is configured to transmit a webhook payload 176 to a particular resolution entity 140 in response to determining one or more issues (e.g., based on a voice call 108) defined as part of the issue trigger 172 associated with the webhook 170. The URL 174 associated with a webhook 170 defines a network address of the particular resolution entity 140 to which the issue manager 150 is to transmit the webhook payload 176.

In one or more embodiments, upon detecting an issue 168 needing resolution based on a voice call 108, the issue manager 150 checks whether the identified issue 168 is defined as an issue trigger 172 for a configured webhook 170. In response to identifying a webhook 170 that defines the identified issue 168 as an issue trigger 172, the issue manager 150 generates a pre-configured webhook payload 176 and routes/transmits the webhook payload 176 to a resolution entity 140 at a defined URL 174 configured for the webhook 170. A webhook payload 176 transmitted to a resolution entity 140 may at least include information relating to the one or more issues 168 that triggered the transmission of the webhook payload 176 to the resolution entity 140, wherein the information may include, but is not limited to, one or more of an identity of the identified issue 168 that triggered transmission of the webhook payload 176, the voice spectrogram 162 of the voice call 108 based on which the issue 168 was determined, the signal attributes 164, or the content 166 of the voice call 108. The webhook payload 176 may include any other information that may be needed by the resolution entity 140 to resolve the identified one or more issues 168.

A resolution entity 140 may be configured to resolve an identified issue 168 (e.g., identified in the webhook payload 176) by implementing/running a resolution workflow 142 that includes a series of resolution steps to resolve the issue 168. In one embodiment, a resolution entity 140 may be configured to determine a resolution workflow 142 for resolving an identified issue 168 using a machine learning (ML) model (e.g., ML model 178 such as an artificial Intelligence (AI) algorithm). The ML model may be trained using known resolution workflows 142 associated with respective known issues 168.

In one embodiment, once a resolution workflow 142 has been identified by a resolution entity 140 (e.g., using an ML model), the issue manager 150 may invite feedback relating to the correctness of the identified resolution workflow 142 from a reviewer. It may be noted that the reviewer may be one of the users 106 of the computing infrastructure 102. For example, the issue manager 150 may transmit information relating to the identified resolution workflow 142 to a computing node 104 operated by the reviewer. The information provided to the reviewer may at least include an identity of the identified issue 168 and the identified resolution workflow 142 including the one or more resolution steps included in the resolution workflow 142. The reviewer may provide feedback including, but not limited to, whether the resolution workflow 142 is correct and/or changes/adjustments to the identified resolution workflow 142 including adding one or more resolution steps, deleting one or more resolution steps included in the resolution workflow 142, and/or modifying one or more resolution steps including in the resolution workflow 142. The feedback 180 may be fed back to the ML model to retrain the ML model and improve identification of subsequent resolution workflows 142.

In certain embodiments, when multiple issues 168 are identified based on a voice call 108, the issue manager may identify (e.g., based on respective webhooks 170) a resolution entity 140 for each identified issue 168 and transmit a respective webhook payload 176 to each of the identified resolution entities 140 that is configured to resolve the respective issues 168.

Figure 2:
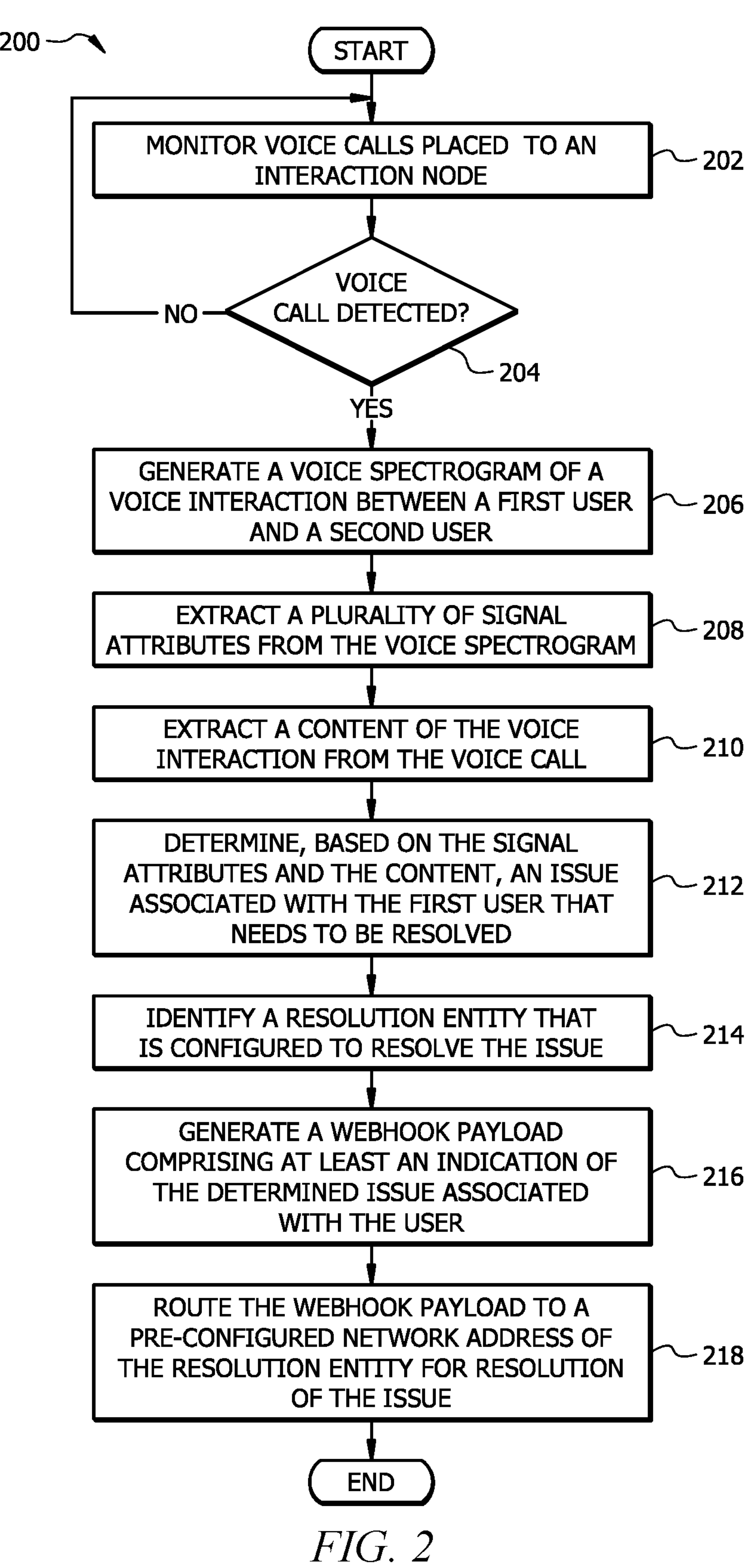
FIG. 2 illustrates a flowchart of an example method for identification and resolution of issues associated with a user, in accordance with one or more embodiments of the present disclosure.

FIG. 2 illustrates a flowchart of an example method 200 for identification and resolution of issues associated with a user, in accordance with one or more embodiments of the present disclosure. Method 200 may be performed by the issue manager 150 shown in FIG. 1.

At operation 202, the issue manager 150 monitors a voice channel 134 provided by an interaction node (e.g., interaction entity 130) for voice calls 108 placed/initiated by users 106 to the interaction entity 130. As described above, a user 106 that is registered/subscribed to receive a service provided by one or more computing nodes 104 (e.g., one or more computing nodes 104*a*-104*f* of the blockchain network 120) of the computing infrastructure 102 may place voice calls 108 to the interaction entity 130 using a voice channel 134 to manage the service, request information relating to the service, and/or raise issues (e.g., complaints) related to the service being received by the user 106. It may be noted that the term "interaction node" corresponds to the interaction entity 130 and refers to a computing node or a hardware device that is configured to receive voice calls 108 using a voice channel 134 supported by the interaction node.

The issue manager 150 may be communicatively coupled to the interaction entity 130 such that the issue manager 150 has access to voice calls 108 placed by users 106 to the interaction entity 130. For example, the issue manager 150 may be configured to monitor the interaction entity 130 for voice calls 108 placed to the interaction entity 130. In one embodiment, a voice call 108 placed by a user 106 to the interaction entity 130 may include a voice interaction (e.g., voice conversation) between the user 106 and an agent 132 that receives the voice call 108 for the interaction entity 130. In alternative embodiment, a voice call 108 may include a voice recording (e.g., a voice message) transmitted by the user 106 to the interaction entity 130 using a voice channel 134 such as email, messaging service, social media or any other channel that allows the user 106 to transmit voice to the interaction entity 130.

At operation 204, when no voice calls 108 are detected, the issue manager 150 continues to monitor for voice calls 108 at operation 202. On the other hand, upon detecting that a voice call 108 to the interaction entity 130 has been placed by a first user 106 using the voice channel 134, method 200 proceeds to operation 206. As described above, the voice call 108 may include a voice interaction between the first user and a second user (e.g., an agent 132) associated with the interaction entity 130.

At operation 206, the issue manager 150 generates a voice spectrogram 162 of the voice interaction between the first user 106 and the agent 132, wherein the voice spectrogram 162 is a representation of a voice signal associated with the voice call 108.

At operation 208, the issue manager 150 extracts a plurality of signal attributes 164 from the voice spectrogram 162, wherein each signal attribute 164 represents a characteristic of the voice signal associated with the voice call 108.

As described above, the issue manager 150 may be configured to generate a voice spectrogram 162 of a voice call 108 placed by a user 106 to the interaction entity 130, wherein the voice spectrogram 162 is a representation of a voice signal associated with the voice call 108. Generally, a voice spectrogram 162 of a voice signal/audio signal is a visual representation of the spectrum of frequencies associated with the voice signal as the voice signal varies with time. Spectrograms associated with audio signals are often also referred to as sonographs, voiceprints, or voicegrams. The issue manager 150 may be configured to extract a plurality of signal attributes 164 from the voice spectrogram 162 of the voice call 108, wherein the signal attributes 164 may include, but are not limited to, one or more of voice modulation, pauses, speech duration, pitch, frequency or loudness.

At operation 210, the issue manager 150 extracts a content 166 of the voice interaction from the voice call 108, wherein the content 166 of the voice interaction comprises words and sentences spoken by the first user 106 and the second user (e.g., agent 132) as part of the voice interaction. As described above, the issue manager 150 may be configured to extract a content 166 of the voice call 108, wherein content 166 of the voice call 108 may include speech included in the voice call 108. For example, the content 166 of a voice call 108 may include words and sentences spoken by the user 106 and/or an agent 132 as part of the voice call 108.

At operation 212, the issue manager 150 determines, based on the signal attributes 164 and the content 166, an issue 168 associated with the first user 106 that needs to be resolved.

As described above, based on the signal attributes and/or the content 166 of the voice call 108 placed by the user 106, the issue manager 150 may be configured to determine one or more issues 168 associated with the user 106 that may need to be resolved. For example, the issue manager 150 may analyze the voice spectrogram 162 of the voice signal associated with the voice call 108 to identify certain known patterns of the signal attributes 164 that are known to be indicative of issues 168 associated with users 106. Indicators of a potential issue being expressed/stated by the user 106 as part of the voice call 108 may include a breathing pattern, a voice modulation pattern, pitch, frequency, amplitude/loudness or a combination thereof. For example, the issue manager 150 may detect that the voice spectrogram 162 includes high pitch and high amplitude signals. This may indicate that the user 106 is speaking loudly (corresponding to high amplitude signals) and at a high pitch, which in turn may indicate that the user is irate and that the user 106 is speaking of a potential issue that may need to be resolved.

In some embodiments, the issue manager 150 may be configured to assign one or more numerical scores based on the signal attributes 164 extracted from the voice spectrogram 162 of the voice call 108. For example, a numerical score may be assigned to a signal attribute 164, wherein a higher value of the signal attribute 164 is assigned a higher numerical score. For example, a higher amplitude may be assigned a higher numerical score. In one embodiment, when the numerical scores assigned to one or more respective signal attributes 164 equal or exceed respective thresholds, the issue manager 150 determines that a potential issue 168 exists. For example, when a first numerical score associated with a pitch and a second numerical score associate with amplitude exceed their respective pitch and amplitude thresholds for a pre-defined time, issue manager 150 determines that an issue 168 exists that may need resolution.

Additionally, or alternatively, the issue manager 150 may be configured to semantically analyze the content 166 of the voice call 108 to identify certain contextual keywords and/or sentences that may indicate that an issue 168 is being reported, stated or discussed in the voice call 108. In one embodiment, the contextual keywords and/or sentences may include specific references to a particular issue 168. For example, the user 106 may explicitly state/report an issue 168 during the voice call 108. For example, the user 106 may call the interaction entity 130 and report that a particular video streaming device does not connect to the video streaming server. In another additional or alternative embodiment, the contextual keywords and/or sentences may include words and/or sentences that are indicative of particular issues 168. For example, while the user 106 may not explicitly state/report a particular issue 168 during the voice call 108, the user's speech and/or conversation with an agent 132 (e.g., during a voice interaction between the user 106 and the agent 132) may indicate that an issue 168 exists. For example, the user 106 may call the interaction entity 130 and ask instructions for connecting a video streaming device to a video streaming server. This indicates the user 106 is potentially having an issue 168 with connecting to the video streaming server. In another example, the content 166 of the voice call 108 may include a conversation between the user 106 and an agent 132 in which the agent 132 repeatedly provides same or similar instructions to the user 106 on how to connect the streaming device to a streaming server. This may indicate that the user 106 is unable to connect to the streaming server after multiple attempts.

In additional or alternative embodiments, the issue manager 150 may be configured to identify one or more issues 168 that need resolving based on a combination of the signal attributes 164 extracted from the voice spectrogram 162 and the content 166 of the voice call 108. For example, the issue manager 150 may determine that a potential issue exists based on the tone and volume of the user's speech. Further, the issue manager 150 may identify a specific issue 168 based on contextual keywords/sentences in the content 166 of the voice call 108.

At operation 214, the issue manager 150 identifies a resolution entity 140 that is configured to resolve the issue.

At operation 216, the issue manager 150 generates a webhook payload 176 comprising at least an indication of the determined issue 168 associated with the user 106.

At operation 208, the issue manager 150 routes the webhook payload 176 to a pre-configured network address (e.g., URL 174) of the resolution entity 140 for resolution of the identified issue 168.

As described above, once an issue 168 is identified based on a voice call 108 placed by a user 106, the issue manager 150 may be configured to forward an indication of the identified issue 168 to a resolution entity 140 that is configured to resolve the identified issue 168. As described above, each resolution entity 140 shown in FIG. 1 is configured to resolve one or more known issues associated with users 106 (e.g., issues relating to one or more services being received by the users 106). For example, when the service includes a video streaming service, a first resolution entity 140 may be configured to resolve issues associated with accounts (e.g., logins, passwords, content subscription etc.), a second resolution entity 140 may be configured to resolve issues including software bugs associated with the streaming platform, and a third resolution entity 140 may be configured to resolve hardware issues associated with devices registered to receive the streaming service.

In one or more embodiments, a webhook 170 may be configured at the issue manager 150 for each resolution entity 140. A webhook 170 is an HTTP-based callback function that allows event driven communication between software applications. Each configured webhook 170 causes the issue manager 150 to transmit a pre-configured webhook payload 176 to a particular resolution entity 140 in response to detection/determination of a pre-configured trigger event. As shown in FIG. 1, a webhook 170 may include an issue trigger 172 and a Uniform Resource Locator (URL) 174. The issue trigger 172 associated with a webhook 170 defines one or more issues 168 that trigger transmission of a pre-configured webhook payload 176 to a resolution entity 140 associated with the webhook 170. In other words, for each configured webhook 170, the issue manager 150 is configured to transmit a webhook payload 176 to a particular resolution entity 140 in response to determining one or more issues (e.g., based on a voice call 108) defined as part of the issue trigger 172 associated with the webhook 170. The URL 174 associated with a webhook 170 defines a network address of the particular resolution entity 140 to which the issue manager 150 is to transmit the webhook payload 176.

In one or more embodiments, upon detecting an issue 168 needing resolution based on a voice call 108, the issue manager 150 checks whether the identified issue 168 is defined as an issue trigger 172 for a configured webhook 170. In response to identifying a webhook 170 that defines the identified issue 168 as an issue trigger 172, the issue manager 150 generates a pre-configured webhook payload 176 and routes/transmits the webhook payload 176 to a resolution entity 140 at a defined URL 174 configured for the webhook 170. A webhook payload 176 transmitted to a resolution entity 140 may at least include information relating to the one or more issues 168 that triggered the transmission of the webhook payload 176 to the resolution entity 140, wherein the information may include, but is not limited to, one or more of an identity of the identified issue 168 that triggered transmission of the webhook payload 176, the voice spectrogram 162 of the voice call 108 based on which the issue 168 was determined, the signal attributes 164, or the content 166 of the voice call 108. The webhook payload 176 may include any other information that may be needed by the resolution entity 140 to resolve the identified one or more issues 168.

A resolution entity 140 may be configured to resolve an identified issue 168 (e.g., identified in the webhook payload 176) by implementing/running a resolution workflow 142 that includes a series of resolution steps to resolve the issue 168. In one embodiment, a resolution entity 140 may be configured to determine a resolution workflow 142 for resolving an identified issue 168 using a machine learning (ML) model (e.g., ML model 178 such as an artificial Intelligence (AI) algorithm). The ML model may be trained using known resolution workflows 142 associated with respective known issues 168.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory configured to store voice calls; and a processor communicatively coupled to the memory and configured to:

detect that a voice call to an interaction node has been placed by a first user using a voice channel, wherein the voice call comprises voice interaction between the first user and a second user associated with the interaction node;

generate a voice spectrogram of the voice interaction between the first user and the second user, wherein the voice spectrogram is a representation of a voice signal associated with the voice call;

extract a plurality of signal attributes from the voice spectrogram, wherein each signal attribute represents a characteristic of the voice signal;

extract a content of the voice interaction from the voice call, wherein the content of the voice interaction comprises words and sentences spoken by the first user and the second user as part of the voice interaction;

determine, based on the signal attributes and the content, an issue associated with the first user that needs to be resolved, wherein determining the issue associated with the first user comprises:

assign a numerical score to each of the plurality of signal attributes extracted from the voice spectrogram; and determine that the issue associated with the first user exists in response to the numerical scores assigned to at least one of the signal attributes exceeding a respective threshold;

identify a resolution entity that is configured to resolve the issue;

generate a webhook payload comprising at least an indication of the determined issue associated with the first user; and route the webhook payload to a pre-configured network address of the resolution entity.

2. The system of claim 1, wherein:

a webhook call is pre-configured for each of a plurality of resolution entities; and the processor is configured to:

generate and transmit a particular webhook payload to a particular resolution entity in response to detecting a respective issue the particular resolution entity is configured to resolve.

3. The system of claim 1, wherein the processor is further configured to:

identify a plurality of issues based on the voice call; and for each of the identified issues, transmit a webhook payload to a respective resolution entity that is configured to resolve the identified issue.

4. The system of claim 1, wherein the processor is configured to use an artificial intelligence (AI) algorithm to determine the issue associated with the first user based on the signal attributes and the content.

5. The system of claim 4, wherein the processor is further configured to:

receive an indication that the determined issue is incorrect; and retrain the AI algorithm based on the received indication.

6. The system of claim 1, wherein the processor is further configured to generate the voice spectrogram in real-time or near real-time as the voice interaction is being conducted between the first user and the second user at the interaction node.

7. The system of claim 1, wherein the plurality of signal attributes extracted from the voice spectrogram comprise one or more of voice modulation, pauses, speech duration, breath, pitch, frequency or loudness.

8. A method comprising:

detecting that a voice call to an interaction node has been placed by a first user using a voice channel, wherein the voice call comprises voice interaction between the first user and a second user associated with the interaction node;

generating a voice spectrogram of the voice interaction between the first user and the second user, wherein the voice spectrogram is a representation of a voice signal associated with the voice call;

extracting a plurality of signal attributes from the voice spectrogram, wherein each signal attribute represents a characteristic of the voice signal;

extracting a content of the voice interaction from the voice call, wherein the content of the voice interaction comprises words and sentences spoken by the first user and the second user as part of the voice interaction;

determining, based on the signal attributes and the content, an issue associated with the first user that needs to be resolved, wherein determining the issue associated with the first user comprises:

assigning a numerical score to each of the plurality of signal attributes extracted from the voice spectrogram; and determining that the issue associated with the first user exists in response to the numerical scores assigned to at least one of the signal attributes exceeding a respective threshold;

identifying a resolution entity that is configured to resolve the issue;

generating a webhook payload comprising at least an indication of the determined issue associated with the first user; and routing the webhook payload to a pre-configured network address of the resolution entity.

9. The method of claim 8, wherein:

a webhook call is pre-configured for each of a plurality of resolution entities; and further comprising:

generating and transmit a particular webhook payload to a particular resolution entity in response to detecting a respective issue the particular resolution entity is configured to resolve.

10. The method of claim 8, further comprising:

identifying a plurality of issues based on the voice call; and for each of the identified issues, transmitting a webhook payload to a respective resolution entity that is configured to resolve the identified issue.

11. The method of claim 8, wherein further comprising using an artificial intelligence (AI) algorithm to determine the issue associated with the first user based on the signal attributes and the content.

12. The method of claim 11, further comprising:

receiving an indication that the determined issue is incorrect; and retraining the AI algorithm based on the received indication.

13. The method of claim 8, further comprising generating the voice spectrogram in real-time or near real-time as the voice interaction is being conducted between the first user and the second user at the interaction node.

14. The method of claim 8, wherein the plurality of signal attributes extracted from the voice spectrogram comprise one or more of voice modulation, pauses, speech duration, breath, pitch, frequency or loudness.

15. A non-transitory computer-readable medium storing instructions that when executed by a processor causes the processor to:

detect that a voice call to an interaction node has been placed by a first user using a voice channel, wherein the voice call comprises voice interaction between the first user and a second user associated with the interaction node;

generate a voice spectrogram of the voice interaction between the first user and the second user, wherein the voice spectrogram is a representation of a voice signal associated with the voice call;

extract a plurality of signal attributes from the voice spectrogram, wherein each signal attribute represents a characteristic of the voice signal;

extract a content of the voice interaction from the voice call, wherein the content of the voice interaction comprises words and sentences spoken by the first user and the second user as part of the voice interaction;

determine, based on the signal attributes and the content, an issue associated with the first user that needs to be resolved, wherein determining the issue associated with the first user comprises:

assign a numerical score to each of the plurality of signal attributes extracted from the voice spectrogram; and determine that the issue associated with the first user exists in response to the numerical scores assigned to at least one of the signal attributes exceeding a respective threshold;

identify a resolution entity that is configured to resolve the issue;

generate a webhook payload comprising at least an indication of the determined issue associated with the first user; and route the webhook payload to a pre-configured network address of the resolution entity.

16. The non-transitory computer-readable medium of claim 15, wherein:

a webhook call is pre-configured for each of a plurality of resolution entities; and wherein the instructions further cause the processor to:

generate and transmit a particular webhook payload to a particular resolution entity in response to detecting a respective issue the particular resolution entity is configured to resolve.

17. The non-transitory computer-readable medium of claim 15, wherein the instructions further cause the processor to:

identify a plurality of issues based on the voice call; and for each of the identified issues, transmit a webhook payload to a respective resolution entity that is configured to resolve the identified issue.

18. The non-transitory computer-readable medium of claim 15, wherein the instructions further cause the processor to use an artificial intelligence (AI) algorithm to determine the issue associated with the first user based on the signal attributes and the content.

19. The non-transitory computer-readable medium of claim 18, wherein the instructions further cause the processor to:

receive an indication that the determined issue is incorrect; and retrain the AI algorithm based on the received indication.

20. The non-transitory computer-readable medium of claim 15, wherein the instructions further cause the processor to generate the voice spectrogram in real-time or near real-time as the voice interaction is being conducted between the first user and the second user at the interaction node.

* * * * *